Patented Sept. 17, 1940

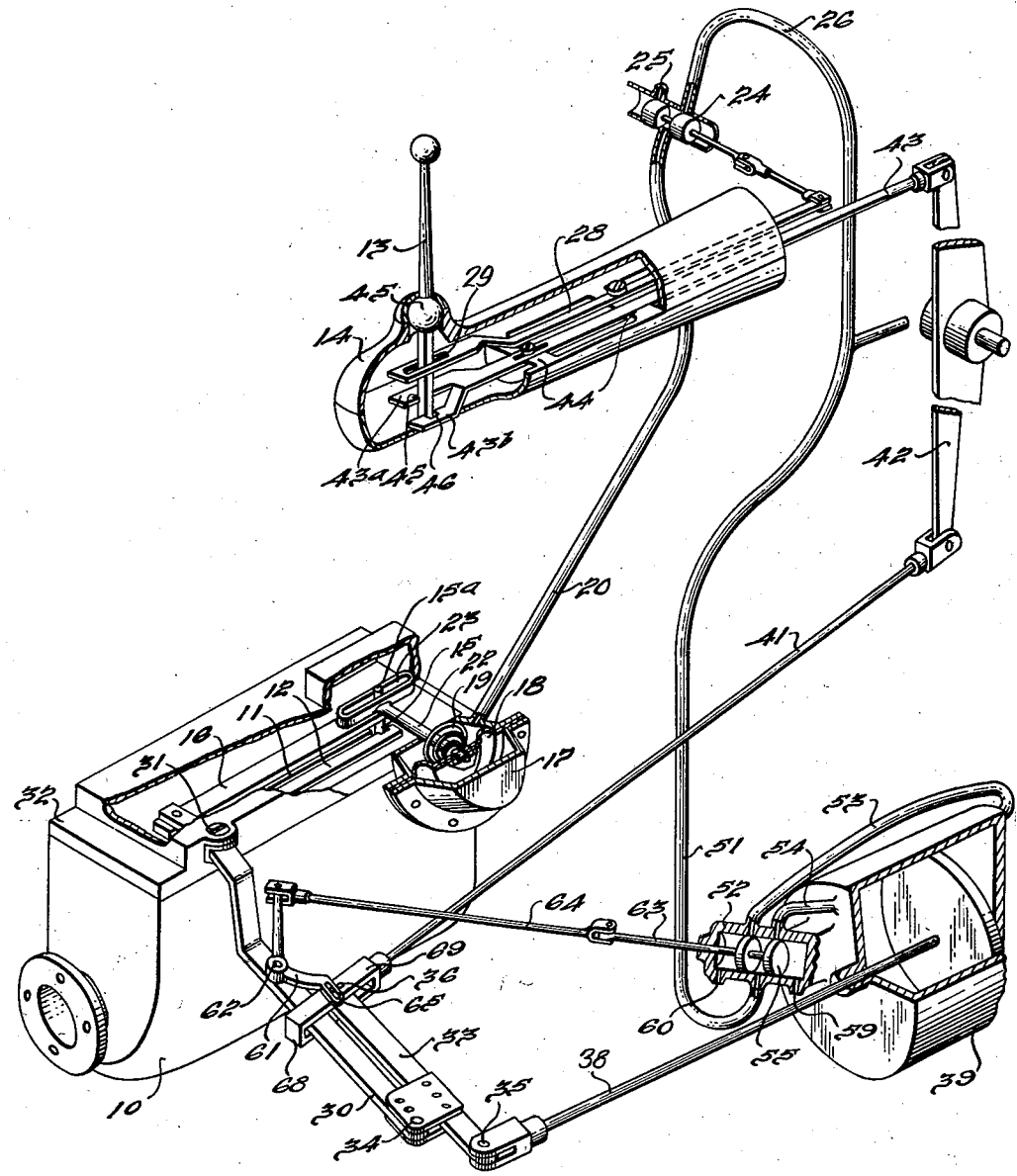

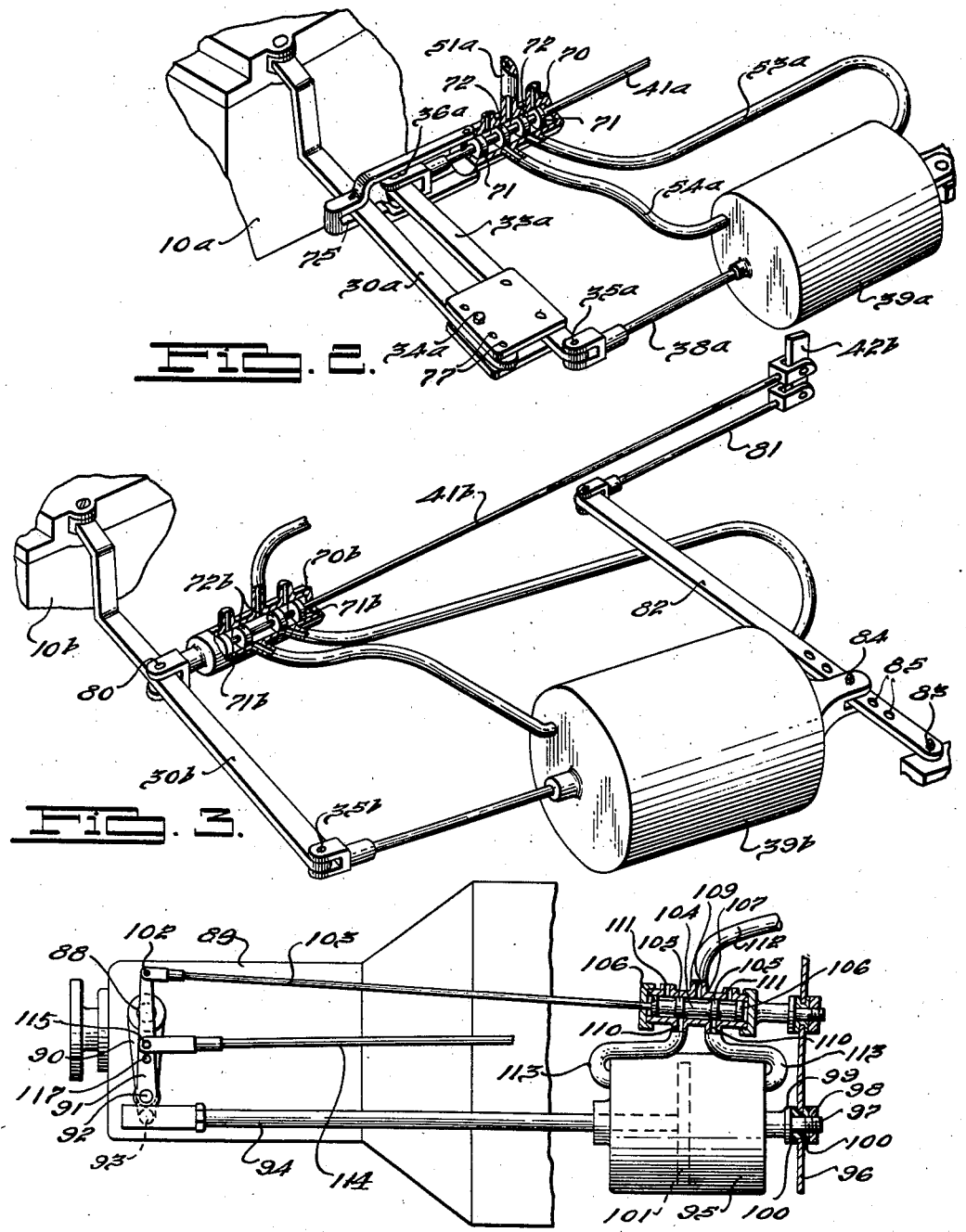

2,215,423

UNITED STATES PATENT OFFICE 2,215,423

AUTOMOTIVE MECHANISM

Paul Heftler, Grosse Pointe, and Louis G. Carmick, Jr., Detroit, Mich., assignors to Automatic Shifters, Inc., Richmond, Va., a corporation of Virginia Application August 28, 1937, Serial No. 161,466

23 Claims. (Cl. 74—335)

This invention relates to gear shifters and has as one of its principal objects the provision of a comparatively simple power mechanism for shifting the gears or dog clutches in conventional transmissions and at the same time preserving to the operator the "feel" of the shift. Mechanisms to accomplish this result have been proposed but these have involved complicated devices to impose a drag on the movement of the manual control member or air cylinders or diaphragms in addition to those required for the actual shifting.

The present invention provides a means for accomplishing the desired results with the least complication and through the use of links and levers not liable to deteriorate or get out of order.

Another object of this invention is the provision of a power gear shifter in which the "feel" in the control handle can be readily adjusted, making the movement of the handle more or less easy as may be required to suit different individuals.

A further object is the provision of a simplified transmission operating apparatus of the type described in which a small predetermined portion of the work of shifting is normally done by the operator, giving him the "feel" of the shift, and the remainder of the work by the shifter motor, while, upon failure of power or of the shifter motor, all of the work may be done by the operator through the same manual handle without any further adjustment of the apparatus.

Other objects of this invention will appear in the following description and appended claims, reference being had to the accompanying drawings forming a part of this specification, wherein like reference characters designate corresponding parts in the several views.

In the drawings,

Fig. 1 is a perspective view, partly broken away, of one of the preferred embodiments of my invention, Figs. 2 and 3 are modifications of part of the mechanism shown in Fig. 1, and Fig. 4 is an elevation, partly in section, of another embodiment of the invention.

Before explaining in detail the present invention, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation, and it is not intended to limit the invention beyond the terms of the several claims hereto appended as considered in view of the prior art and the requirements thereof.

The embodiment of the invention shown in Fig. 1 is applied to a conventional automobile transmission 10 containing two shift rails 11 and 12 which are each longitudinally slidable in either direction from a neutral position to selectively engage any one of the various ratio gears in the transmission. The invention comprises a mechanism for moving the shift rails 11 and 12 in accordance with the movement of a small gear shift lever 13, which may be carried by a hollow bracket 14 projecting back from the instrument panel of the automobile.

The shift rails 11 and 12 are selectively acted upon by a pin 15 carried on one end of a link 16. The link can swing to either side and cause the pin 15 to engage a notch in either shift rail 11 or 12. The lateral position of the link 16 is controlled by a small cross-over motor 17 comprising a diaphragm 18 urged in one direction by a spring 19 and arranged to be moved in the opposite direction by suction applied through a tube 20. The center of the diaphragm 18 is secured to and moves a rod 22 which carries an elongated guide 23 parallel to the shift rails 11 and 12. An upward extension 15a of the shift rail engaging pin 15 on the link 16 fits into the guide 23, so that as the diaphragm 18 in the cross-over motor moves to one side or the other as suction is applied or is not applied to it, the link 16 and pin 15 will be swung to one side or the other and the pin 15 will engage one shift rail or the other.

The application of suction to the cross-over motor 17 is controlled by a valve 24 by which the tube 20 leading to the motor can be selectively connected to a vent 25 or to a tube 26 connected to the intake manifold of the engine of the vehicle. The valve 24 is operated from a longitudinal lever 28 extending into the bracket 14 and having a longitudinal slot 29 through which the control lever 13 extends. Thus, the valve 24 will be operated only by lateral swinging of the longitudinal lever 28, and the pin 15 will be swung to one side or the other into the notch in one shift rail 11 or the other 12 according to the position of the control lever 13.

Longitudinal movement of the shift rails 11 and 12 is effected through a shift lever 30 mounted on a fulcrum 31 in the cover 32 of the transmission and having the link 16 pivoted to it at its inner end. The outer end of the shift lever 30 carries a floating lever 33 secured to it by an adjustable pivot 34 and having pivots 35, 36 at its respective ends. The pivot 35 at the outer end of the floating lever connects it to the piston rod 38 of a double acting air cylinder 39 which is secured to the frame or other fixed part of the vehicle by a resilient or pivotal connection which will allow it to swing laterally enough to follow the swinging movement of the levers 30 and 32.

The greater part of the energy required to shift the gears is normally supplied by the air cylinder 39, and the remainder is supplied from the control handle 13 through a control link 41 connected to the pivot 36 at the inner end of the floating lever 33. The control link 41 is connected to the control handle 13 by a lever 42 or other suitable mechanism and by a link 43 slidably mounted in guides 44 within the hollow bracket 14 which carries the control handle 13. The end of the sliding link 43 which is acted upon by the control handle or lever 13 is divided into two branches 43a and 43b at either side of the lever 13 and at different distances from its fulcrum 45. Each of the branches 43a and 43b has a notch 45 or 46 into which the control lever 13 can swing as it is moved from one side to the other, the notches being so placed that the lever can swing laterally from one to the other when it is approximately in its mid-position longitudinally. The provision of the two notches 45 and 46 at different distances from the fulcrum 45 attains two results. It prevents the handle or lever 13 from being swung laterally except when in its mid-position, thus confining it to movement along a path having the H-shape generally characteristic of gear shift lever movements. It also provides equal movements of the control handle 13 along either leg of its H-shaped path when the shifter is used with a transmission having shift rails which move different distances, as is common when synchronizing devices are provided for second and third speeds but not for first or reverse.

The air cylinder 39 is actuated by suction coming to it through a tube 51 from the engine intake manifold, a valve body 52 fixed to the exterior of the cylinder, and tubes 53 and 54 leading from the valve to either end of the cylinder. The valve body 52 contains a spool-shaped piston 55 which is so arranged that, when it is moved in one direction from its neutral position, it connects the tube 51 from the source of suction to the tube 53 from one end of the cylinder 39 and connects the tube 54 from the other end of the cylinder to a vent 59 or 60 and, when it is moved in the other direction, reverses these connections.

The valve piston 55 is moved in accordance with the movements of the control rod 41 and floating lever 33 relative to the main gear shift lever 30. This is accomplished through a small dog-leg lever 61 carried by a fulcrum 62 on the main lever 30 and having one end connected to the spindle 63 of the valve piston 55 by a link 64 and having the other end connected to either the floating lever 33 or to the control rod 41 by a pin and slot or other suitable connection 65. The dog-leg lever 61 and the valve 52, 55 are preferably arranged so that the spindle 63 of the valve piston and the link 64 are in line and have their axes intersecting the axis of the pivot 31 of the main lever 30 when the various parts are in their neutral positions. With this arrangement, any movement of the floating lever 33 with respect to the main lever 30 will swing the dog-leg lever 61 on its pivot 62 and move the valve piston 55 in the direction which will cause the piston rod 38 to move so as to return the floating lever to its normal position parallel with the main lever. Thus, when the control rod 41 is moved in either direction, the floating lever 33 will be displaced from parallelism with the main lever 30, and the cylinder or motor 39 will operate to return it to parallelism as soon is it displaced enough to operate the valve 52, 55. The two ends of the floating lever 33 will therefore move almost simultaneously, one end being moved manually through the control link 41 and the other being moved in step with it by the power cylinder 39, and the floating lever 33 will move the main lever 30 and cause whichever shift rail is connected to it by the swinging link 16 to be slid longitudinally.

The force exerted by the floating lever 33 at the outer end of the main lever 30 will be equal to the sum of the forces applied to the floating lever 33 by the piston rod 38 and the control rod 41. Since these two last-mentioned forces are obviously always proportional to each other, the force in the control rod 41 will always be proportional to their sum and therefore to the resistance offered to the movement of the main lever 30. Thus the operator will feel the varying resistance to shifting offered by the transmission and will be able to shift as well as with a conventional shift lever. He will feel the synchronizing cones come into engagement or feel the ends of the gear teeth butt against each other or slide past, and in each case he will know when to press on with the shift or to hesitate.

In case of failure of the power cylinder 39 to operate, it may be desirable to be able to shift gears manually. For instance, the engine may cease to run and provide suction for the power cylinder 39 while the car is in gear, and it may be desired to place the gears in neutral while the car is being towed away to be repaired. In order to allow manual shifting, the amount of movement of the control rod 41 relative to the main lever 30 is restricted to what is necessary to operate the valve 55. Further movement in one direction is prevented by the floating lever 33 coming into contact with one side of the main lever 30 and in the other direction is prevented by the closed end 68 on the yoke 69 on the end of the control rod 41 coming into contact with the other side of the main lever 30. Thus, if the suction to the power cylinder 39 fails for any reason, the control rod 41 can act directly upon the main lever 30, after a small amount of lost motion is taken up, and shifts can be made manually.

A modification of the device shown in Fig. 1 is shown in Fig. 2. In this form of the device, the transmission 10a, the main lever 30a, the floating lever 33a, the power cylinder 39a, the piston rod 38a, the control rod 41a, the mechanism for moving the control rod 41a, and the cross-over mechanism are generally similar to the corresponding parts in the form of the device shown in Fig. 1.

The valve body 70 for controlling the application of suction to the two ends of the power cylinder 39a is slidably mounted upon the control rod 41a and is connected by flexible tubes 51a, 53a, and 54a to the source of suction and to the power cylinder 39a. Within the valve body 70 and secured to the control rod 41a are four collars 71, 72 of which the inner pair 72 regulate the application of suction to and the venting of the power cylinder 39a while the outer pair 71 serve merely as stops to limit the motion of the control rod 41a relative to the valve body 70. The control rod 41a extends through the valve body 70 and is secured by a pivot 36a to one end of the floating lever 33a and the valve body 70 is connected to the main lever 30a by a link 75. Thus the valve 70, 72 will be operated by relative movement of the main and floating levers 30a and 33a and will produce the same effects as the valve 52, 55 in the first form of the invention, and, upon failure of suction for the power cylinder, the stops 71 acting upon the ends of the valve body 70 will provide a direct mechanical connection between the control rod 41a and the main lever 30a to permit manual shifting. While the valve body 70 has been shown integral with its ends and the collars 71 and 72 have been shown integral with the control rod 41a for convenience of illustration, these parts are each composed of several portions for ease of manufacture and assembly.

This form of the device is provided with means for readily adjusting the "feel," that is, for adjusting the proportion of the resistance to the shift that is felt by the operator. For this purpose the pivot 34a of the floating lever 33a to the main lever 30a is adjustable, a plurality of closely spaced holes 77 being provided into any of which the pivot 34a can be placed. Thus the ratio of the lengths of the two arms of the floating lever 33a can be varied and the fraction supplied through the control rod 41a of the total force applied to the main lever can be varied.

A further modification of a part of the device is shown in Fig. 3. In this form, the transmission 10b, the main lever 30b, the power cylinder 39b, the cross-over mechanism, and the mechanism for operating the control rod 41b are similar to the corresponding parts of the first form of the device. The control rod 41b extends into the valve body 70b, which is secured to the main lever 30b by a pivot 80, and carries four collars 71b and 72b within the valve body 70b, the four collars being similar to and performing the same functions as the four collars 71 and 72 on the control rod 41a in the form of the device shown in Fig. 2.

The "feel" of the shift is not provided through the control rod 41b, which serves only to operate the valve members 72b or to move the main lever 30b by means of the stops 71b in case power cylinder 39b is inoperative. Instead, a separate link 81 connects the lever 42b which moves the control rod to a secondary lever 82 mounted on a fixed fulcrum 83 and carrying the power cylinder 39b by means of a pivot 84. Thus, when the power cylinder 39b is energized and exerts a force at its connection 35b to the main lever 30b to overcome the resistance offered by the mechanism in the transmission 10b, it will exert an equal force on its connection 84 to the secondary lever 82, and a fixed fraction of this force will be applied by the secondary lever and the link 81 to the member 42b which moves the control link 41b. The operator moving the member 42b and the control link will therefore at all times feel a force proportional to the resistance to shifting. The ratio of this force to the resistance to shifting can be varied merely by shifting the position of the anchoring pivot 84 of the power cylinder, a number of holes 85 being provided along the length of the secondary lever 82 for this purpose.

The form of the invention shown in Fig. 4 is particularly adaptable to marine reverse gears and to automobile transmissions having little room at their sides, as is the case in many automobiles having frames braced by long diagonal members meeting just behind the transmission. In the case of a marine reverse gear, the device is arranged to turn a short shaft 88 projecting from the side of the housing 89. In the case of an automobile transmission, the shaft 88 is arranged to move the shift rails which are within the housing 89, the shift rails being preferably at the side of the housing instead of at the top, as is conventional in so-called "rolled over" transmissions, and any suitable cross-over mechanism, such as the one shown in Fig. 1, being used to selectively connect the shaft 88 to one shift rail or the other.

The shaft 88 has fixed to it a depending main lever 90 at the end of which a floating lever 91 is carried by a pivot 92. One arm of the floating lever 91 is connected by a pivot 93 to the piston rod 94 of a double acting power cylinder 95 anchored to a fixed bracket 96 by a connection which will allow a slight swinging of the cylinder. This connection comprises a stud 97 projecting from the cylinder through the bracket and carrying a nut 98 which cooperates with a shoulder 99 around the stud to clamp the bracket between the ends of rubber washer 100.

The other arm of the floating lever 91, which is several times as long as the arm connected to the power cylinder, is connected by a pivot 102 to a valve rod 103. The valve rod is secured to a movable valve member 104 having four collars 105, 106 slidably fitting within the bore of a valve body 107. The valve body 107 is secured to the bracket 96 in the same way as the power cylinder 95 and is provided with five ports 109, 110, 111 cooperating with the collars 105 on the movable valve member. The ports and collars are arranged in the same way as those in the valves in the embodiments shown in Figs. 2 and 3. The central port 109 is connected by a flexible tube 112 to a source of suction, such as the intake manifold of an engine, and the two ports 110 at either side of the central port are connected to the ends of the power cylinder by flexible tubes 113. The end ports 111 are open to the atmosphere and serve as vents.

It may be seen from the figure that the collars 105 on the movable valve member are the same width as and are spaced slightly farther apart than the ports 110 connected to the ends of the power cylinder 95. This provides what is termed "vacuum suspension" of the piston 101 within the power cylinder 95, that is, the piston has vacuum or suction applied to both sides whenever it is at rest and quicker response to movement of the valve member 105 is provided than would be provided by other arrangements. This is so because the piston 101 is moved by the admission of air to one side while the other side is under suction, the air being so admitted almost instantaneously because it has to flow through a relatively short path from one of the vents 111.

When the movable valve member 104 is moved in one direction from its neutral position, one of the ports 110 leading to the cylinder will be placed in communication with the atmosphere and the other, which is already slightly open to the suction from the tube 112 will be opened more. Thus the piston will move in the direction in which the valve member 104 is displaced. The necessary displacement of the valve member is produced by the floating lever 91 and a control rod 114 secured by a pivot 115 near the middle of the lever. The control rod is manually operated by any suitable linkage, the one shown in Fig. 1 for operating the control rod 41 being suitable. It may be readily seen that, for every position of the control rod 114 and its pivot 115, there will be a position of the piston rod 94 and its pivot 93 at which the movable valve member 104, valve rod 103 and its pivot 102 will be in their neutral positions. It may also be seen that, if the piston rod 94 and pivot 93 are not in that position, the valve member 104 will be at that side of its neutral position which will admit air and suction to the cylinder 95 in such a way as to move the piston 101 and piston rod 94 to that position. Thus the piston 101 and piston rod 94 will follow all movements of the control rod 114.

The control rod 114 not only will control the movement of the piston 101 but will also always be subjected to a force proportional to the resistance to movement of the main shifting lever 90, thus giving the operator the "feel" of the shift. This occurs because the pivots 92 and 93 of the floating lever 91 to the main lever and to the piston rod 94 are spaced from each other a short distance, and any force exerted on the piston rod pivot 93 causes a proportional reaction on the control rod pivot 115.

In case of failure of the cylinder 95 to operate, the form of the invention shown in Fig. 4 can be manually operated through the control rod 114 in the same way as the other forms shown in Figs. 1 to 3. The collars 106 at the ends of the movable valve member 104 serve as stops and allow the pivot 102 between the valve rod and the floating lever to serve as a fulcrum. This occurs after the valve member 104 moves beyond its normal range of action and its movement is stopped by one of the collars 106. The control rod can then swing the floating lever 91 about the valve rod pivot 102 and move the main shift lever 90 mechanically.

Various strengths of "feel" can be provided by changing the distances between the various pivots 92, 93, 102, and 115 on the floating lever, as by shifting the control rod 114 to a pivot 117 nearer the pivot 92 of the main lever. By similar means, the ratio of the movements of the control rod 114 and the piston rod 94 and the ratio of the movements of the control rod 114 and the valve rod 103 can be varied.

While we have shown only four forms of the invention, it is obvious that it can exist in numerous other forms and can be applied to other mechanisms for shifting gears. For example, the vacuum suspension feature, while desirable, may be omitted, different types of valves may be used, and air or other gas or liquid under pressure may be employed to operate the power cylinder. The latter may be replaced by other forms of motors, such as a bellows or diaphragm. It is to be understood therefore that what is included in the invention is not limited by the examples described herein but only by the scope of the appended claims.

We claim:

1. The combination with a transmission having a transmission-operating member movable in opposite directions from a neutral position into different transmission setting positions, of means for moving said operating member comprising a motor means for applying a force thereto, a manually movable control member accessible to the operator and connected to control the energization of said motor means, and a normally freely movable lever, subject to the application thereto of force generated solely by the hand of the operator and, by said motor means, for applying a smaller and substantially proportional force to said control member opposing the movement thereof simultaneously with the application of said first-mentioned force, whereby the operator will feel a resistance to movement of the control member substantially proportional to the resistance encountered by said operating member.

2. The combination with a transmission having a transmission-operating member movable in opposite directions from a neutral position into different transmission setting positions, of a fluid pressure motor having a pair of chambers and pressure responsive means therebetween having motion transmitting connection with said movable member, a source of non-atmospheric pressure, a pair of valve members relatively movable in accordance with the movement of said pressure responsive means, said valve members being ported to connect either chamber to the atmosphere and the other to said source when moved away from a predetermined relative position, the ports in said valve members being arranged to connect both of said chambers to said source when said valve members are in said predetermined relative position, and a normally freely movable lever, connected to be subjected to the application thereto of forces generated solely by the hand of the operator and by said motor, for resisting movement of said other valve member away from said relative position.

3. The combination with a transmission having a transmission-operating member movable in opposite directions from a neutral position into different transmission setting positions, of a fluid pressure motor having a pair of chambers and pressure responsive means therebetween having motion transmitting connection with said movable member, a source of non-atmospheric pressure, a pair of valve members relatively movable in accordance with the movement of said pressure responsive means, said valve members being ported to connect either chamber to the atmosphere and the other to said source when moved away from a predetermined relative position, the ports in said valve members being arranged to connect both of said chambers to said source when said valve members are in said predetermined relative position, manually operable means for relatively moving said valve members, and a normally freely movable lever having motion transmitting connection with said motor for resisting movement of said manually operable means, in any point in the movement of said manually operable means and in either direction of movement thereof, to a degree substantially proportionate to the resistance encountered by said shiftable member.

4. The combination with a transmission having a transmission-operating member movable in opposite directions from a neutral position into different transmission-setting positions, of a double acting motor for applying a force to said operating member, a manually operable member movable in opposite directions from a neutral position and connected to control energization of said motor, and a lever, connected to be subjected to the application thereto of forces generated solely by the hand of the operator and by said motor, for applying a smaller and substantially proportional force to said manually operable member opposing movement thereof in either direction from its neutral position simultaneously with the application of the first-mentioned force to move said operating member in either direction, whereby the operator will feel a resistance to the movement of the manually operable member in either direction from its neutral position substantially proportional to the resistance encountered by said shiftable member.

5. The combination with a transmission having a shiftable transmission-operating member, of a motor connected to actuate said shiftable member, a manual control handle, regulating means to control the energization of said motor operably connected to said motor and to said handle, a lever and a lost motion connection connecting said control handle to said motor and said operating member, said lever being connected to be subjected to forces delivered thereto solely by said handle and by said motor and operating with said lost motion connection so that in normal operation a predetermined portion of the work of shifting is done by the operator through said control handle and said lever and, upon failure of the motor, all of the work of shifting is done by the operator through said control handle and said lost motion connection.

6. The combination with a transmission having a movable transmission-operating member for providing different gear ratios, of an actuating mechanism connected to move said operating member and including a motor, a manually operable member connected to control said motor, said mechanism including a lever having motion transmitting connection with and subjected solely to forces originating in said motor and said manually operable member to transmit to said manually operable member a force proportional to the force exerted by said motor whereby the operator will feel a resistance to the movement of said manually operable member substantially proportional to the resistance encountered by said operating member and whereby a predetermined portion of the work of moving said operating member will be supplied by said operator.

7. The combination with a transmission having a transmission-operating member movable in opposite directions from a neutral position into different transmission-setting positions, of means for moving said operating member comprising a motor means for applying a force thereto, a manually movable control member accessible to the operator and connected to control the energization of said motor means, a floating lever connected to be subjected to forces delivered thereto solely by said motor means and by said manually movable control member for applying a smaller and substantially proportional force to said control member opposing the movement thereof simultaneously with the application of said first-mentioned force, whereby the operator will feel a resistance to movement of the control member substantially proportional to the resistance encountered by said operating member, and means for adjusting the position of one of the pivots on said lever and thereby adjusting the ratio between said forces and adjusting the strength of the "feel."

8. The combination with a transmission having a transmission-operating member movable in opposite directions from a neutral position into different transmission-setting positions, of a double acting pneumatic motor having motion transmitting connection with said operating member, a valve for controlling said motor, a manually operable control member, a floating lever having motion transmitting connection with the transmission-operating member, the valve and the control member, and stops associated with the valve for limiting the relative movement of the parts thereof.

9. The combination with a transmission having a transmission-operating member movable in opposite directions from a neutral position into different transmission-setting positions, of a swingably mounted double acting air cylinder having a piston and piston rod connected to said operating member, a valve controlling the admission and release of air to the opposite sides of said piston, said valve comprising a stationary portion fixed to said cylinder and a movable portion, a manually operable control member, and a floating lever pivotally connected to and interconnecting the transmission-operating member, the movable portion of the valve, and the manually operable control member.

10. The combination with a transmission having a transmission-operating member movable in opposite directions from a neutral position into different transmission-setting positions, of a floating lever pivoted to said operating member, a double acting air cylinder having a piston and piston rod connected to the floating lever, a manually operable control member connected to the floating lever, a valve controlling the admission and release of air to and from the opposite sides of said piston, said valve comprising two relatively movable portions one connected to the control member and the other connected to the transmission-operating member.

11. The combination with a transmission having a transmission-operating member movable in opposite directions from a neutral position into different transmission-setting positions, of a manually operable control member, a lever connected to the manually operable control member and having a fixed fulcrum, a double acting air cylinder and piston connecting the lever and the transmission-operating member, a valve controlling the admission and release of air to and from the opposite sides of said piston, said valve comprising two relatively movable portions one connected to the control member and the other connected to the transmission operating member.

12. The combination with a transmission having a transmission-operating member movable in opposite directions from a neutral position into different transmission-setting positions, of a floating lever connected to said operating member, a motor connected to the floating lever, means for controlling said motor and connected to the floating lever, and a manually operable control member connected to the floating lever, the four connections on the floating lever all being spaced from each other.

13. The combination with a transmission having a transmission-operating member movable in opposite directions from a neutral position into different transmission setting positions, of a fluid pressure motor having a pair of chambers and pressure responsive means therebetween having motion transmitting connection with said movable member, a source of non-atmospheric pressure, a pair of valve members relatively movable in accordance with the movement of said pressure responsive means, said valve members being ported to connect either chamber to the atmosphere and the other to said source when said valve members are moved away from a predetermined relative position, the ports in said valve members being arranged to balance pressures in said chambers when said valve members are in said predetermined relative position, and a normally freely movable lever for resisting movement of said valve members away from said predetermined relative position, said lever connected to be subjected to the application thereto of forces generated solely by the hand of the operator and by said motor.

14. The combination with a transmission having a transmission-operating member movable in opposite directions from a neutral position into different transmission setting positions, of a fluid pressure motor having a pair of chambers and pressure responsive means therebetween having motion transmitting connection with said movable member, a source of non-atmospheric pressure, a pair of valve members relatively movable in accordance with the movement of said pressure responsive means, said valve members being ported to connect either chamber to the atmosphere and the other to said source when said valve members are moved away from a predetermined relative position, the ports in said valve members being arranged to balance pressures in said chambers when said valve members are in said predetermined relative position, manually operable means for relatively moving said valve members, and a normally freely movable lever having motion transmitting connection with said motor for resisting movement of said manually operable means in any point in the movement of said manually operable means and in either direction of movement thereof to a degree substantially proportionate to the resistance encountered by said shiftable member.

15. The combination with a transmission having a transmission-operating member movable in opposite directions from a neutral position into different transmission setting positions, of a double acting motor for applying a force to said operating member, a manually operable member movable in opposite directions from a neutral position, a follow-up valve mechanism operable by said manually operable member and by said motor and connected to control energization of said motor, and a lever, connected to be subjected to the application thereto of forces generated solely by the hand of the operator and by said motor, for applying a smaller and substantially proportional force to said manually operable member opposing movement thereof in either direction from its neutral position simultaneously with the application of the first-mentioned force to move said operating member in either direction, whereby the operator will feel a resistance to the movement of the manually operable member in either direction from its neutral position substantially proportional to the resistance encountered by said shiftable member.

16. The combination with a transmission having a transmission operating member movable in opposite directions from a neutral position into different transmission setting positions, of floating lever means having motion transmitting relation with said operating member, a motor having motion transmitting relation with said floating lever means, means for controlling said motor and having motion transmitting relation with said floating lever means, and a manually operable control member having motion transmitting relation with said floating lever means, the points of motion transmitting relation of said floating lever means all being spaced from each other.

17. The combination with a transmission having a transmission operating member movable in opposite directions from a neutral position into different transmission setting positions, of a differential fluid pressure motor connected to transmit forces to said operating member, a follow-up valve mechanism for controlling said motor, a manually operable control member connected to transmit movement to said valve mechanism, and floating lever means connected to be subjected to forces transmitted solely from said control member and said motor and constructed and arranged to transmit from said motor to said control member forces proportional to the forces generated by said motor.

18. The combination with a transmission having a transmission operating member movable in opposite directions from a neutral position into different transmission setting positions, of a motor having motion transmitting connection with said operating member, control means connected to control the operation of said motor, a manually operable member having motion transmitting connection with said control means, and floating lever means having mechanical connection for transmitting thereto forces originating solely in said motor and said manually operable member and being arranged to transmit from said motor to said manually operable member forces acting against the direction of manual movement of said manually operable member uniformly proportional to the forces generated by said motor.

19. The combination with a transmission having a transmission operating member movable in opposite directions from a neutral position into different transmission setting positions, of a differential fluid pressure motor having motion transmitting connection with said operating member, a manually operable member, a follow-up control valve mechanism having motion transmitting connection with said motor and said manually operable member, and floating lever means having connections for transmitting thereto forces originating solely in said motor and said manually operable member and being arranged to transmit from said motor to said manually operable member forces acting against the direction of manual movement of said manually operable member uniformly proportional to the differential pressures in said motor.

20. The combination with a transmission having a transmission-operating member movable in opposite directions from a neutral position into different transmission setting positions, of a floating lever having four pivot points thereon spaced from each other, said floating lever being connected at one of said pivot points to said operating member, a differential fluid pressure motor having a pressure movable member connected to a second pivot point on said floating lever, a valve mechanism for controlling said motor connected to a third pivot point on said lever, and a manually operable mechanism connected to the remaining pivot point on said lever.

21. The combination with a pair of shiftable members for providing different gear ratios in a transmission, of a selecting mechanism, means for operating said mechanism for selectively conditioning said shiftable members for actuation, a motor for applying a force to the selected shiftable member for moving it in either direction, a manual control member, a follow-up control mechanism operable by said manual member and constructed and arranged to cause said motor to move the selected shiftable member a distance proportional to the distance of movement of said manual member, and a normally freely movable lever subject to the application thereto of forces generated solely by the hand of the operator and by said motor for transmitting a force reaction to said manual member substantially proportional to the force generated by said motor, said lever being constructed and arranged to be ineffective for transmitting a force reaction to said manual member when said motor is deenergized.

22. The combination with a pair of shiftable members for providing different gear ratios in a transmission, of a selecting mechanism, means for operating said mechanism for selectively conditioning said shiftable members for actuation, a fluid pressure motor for applying a force to the selected shiftable member for moving it in either direction, a manual control member, a follow-up control valve mechanism operable by said manual member and by said motor to cause the latter to partake of a follow-up action with respect to said manual member, and a floating lever constructed and arranged with respect to said manual member, said motor and the selected shiftable member for causing the follow-up operation of said valve mechanism, said lever being normally freely movable and subject to the application thereto of forces generated solely by the hand of the operator and by said motor for transmitting a force reaction to said manual member substantially proportional to the force generated by said motor, said lever being constructed and arranged to be ineffective for transmitting a force reaction to said manual member when said motor is deenergized.

23. The combination with a transmission having a transmission operating member movable in opposite directions into different transmission-setting positions, of a double acting pneumatic motor having motion transmitting connection with said operating member, a valve for controlling said motor, a manually operable control member, a floating lever having motion transmitting connection with the transmission-operating member, the valve and the control member, and means for providing limited movement of said manually operable member in either direction of movement relative to said transmission-operating member whereby the latter will be manually movable in either direction by said control member upon a failure of power in said motor.

PAUL HEFTLER.
LOUIS G. CARMICK, Jr.